Figure 1:
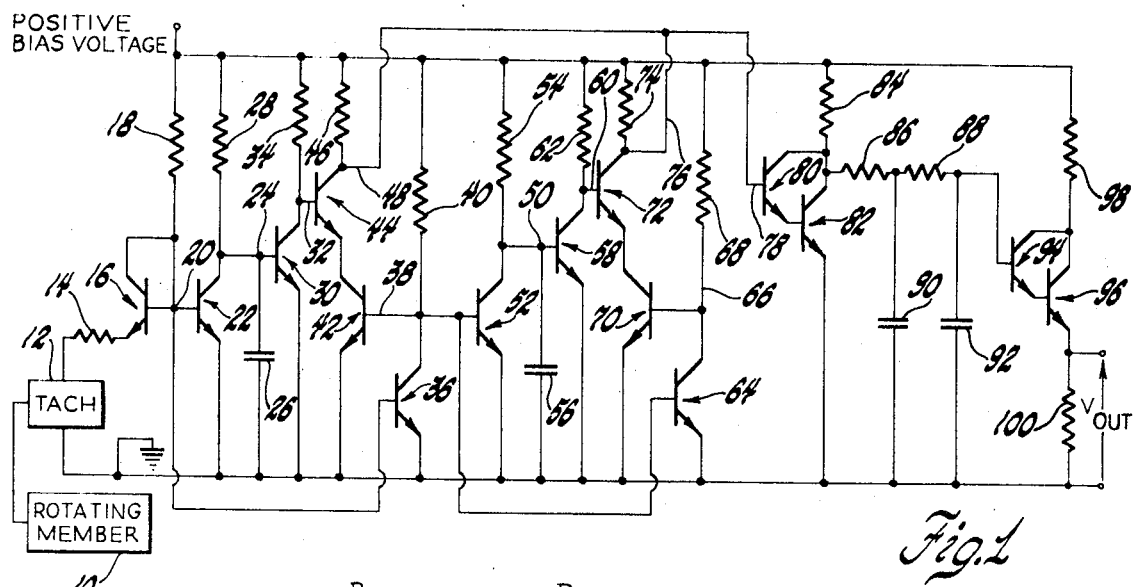

United States Patent [19]
Roesner

[11] 3,735,257
[45] May 22, 1973

[54] TACHOMETER PROCESSING CIRCUIT USING LOGIC DEVICE TO GENERATE EQUAL WIDTH PULSES

[75] Inventor: Bruce B. Roesner, Lafayette, Ind.

[73] Assignee: General Motors Corporation, Detroit, Mich.

[22] Filed: Oct. 12, 1971

[21] Appl. No.: 188,088

[52] U.S. Cl. ............................. 324/78 E, 307/233
[51] Int. Cl. ..................... G01r 23/02, H03k 5/20
[58] Field of Search ............... 324/78 E, 78 I, 161; 307/233

[56] References Cited
UNITED STATES PATENTS

| | | | |
|---|---|---|---|
| 3,585,400 | 6/1971 | Brayton | 307/233 |
| 3,497,719 | 2/1970 | Scourtes | 324/78 J |

Primary Examiner—Alfred E. Smith
Attorney—W. W. Christen and C. R. Meland

[57] ABSTRACT

A voltage level analog of the frequency of a rotating member is developed by a tachometer processing circuit using a NAND logic device. A first pulse train related in frequency with the frequency of the rotating member is applied to an RC timing circuit to control a transistor switching device to develop a second pulse train at the transistor output at the same frequency as the first pulse train, but having pulse widths differing by a fixed predetermined amount of dwell. The second pulse train and an inverted version of the first pulse train are applied to a NAND logic device to develop a pulse train having pulses with widths equal to the dwell by which pulses in the second train exceed pulses in the first train. The pulses developed by the NAND logic device are averaged by an RC filter to provide a DC analog of frequency.

4 Claims, 2 Drawing Figures

INVENTOR.
*Bruce B. Roesner*
BY
*C. R. Meland*
ATTORNEY

TACHOMETER PROCESSING CIRCUIT USING LOGIC DEVICE TO GENERATE EQUAL WIDTH PULSES

This invention relates to a circuit for measuring the frequency of pulses in a pulse train wherein a NAND logic device develops a pulse having a predetermined width for each cycle of the frequency monitored and wherein means for integrating these pulses is included to develop a DC voltage level analog of frequency.

Prior art tachometer processing arrangements often comprise a Schmitt trigger connected with a one-shot monostable multivibrator to generate pulses of controlled widths at the frequency to be measured. In these circuits, the output state of the Schmitt trigger is controlled by an input signal, and the Schmitt trigger causes the multivibrator to generate a single pulse of predetermined width for each cycle of the input signal. A voltage analog indication of frequency is developed by averaging the equal width pulse outputs from the multivibrator.

In contrast, the tachometer of the instant invention operates without a Schmitt trigger or a monostable multivibrator. An input periodic signal, which can be related to the speed of rotation of a rotating member, is connected with a processing circuit to develop equal width pulses at the output of a NAND logic device. Modification of the periodic signal to change pulse duration and subsequent comparison of the input pulses with the modified pulses by the NAND logic device are the key features of the instant invention.

Temperature stability is improved with the tachometer of the present invention by comparison to temperature stability in the prior art Schmitt trigger-monostable circuits. This improved stability is apparent in view of the operating sector of the RC timing circuit exponential used in the two tachometer arrangements. The instant invention requires a lesser working range on the exponential curve and, accordingly, effects of shifts of the curve caused by temperature changes are reduced.

Additionally, a Schmitt trigger-monostable tachometer is somewhat nonlinear with frequency whereas the tachometer of the present invention has an output voltage level analog less sensitive to frequency enabling it to provide an output more nearly linear than that provided by a typical Schmitt trigger-monostable processing circuit.

It is an object of the present invention to provide a tachometer to develop a DC voltage level analog of frequency without using a Schmitt trigger or a monostable multivibrator by processing a periodic waveform to develop equal width pulses at the output of a logic device for averaging as the DC analog.

Another object of the present invention is to use an RC timing circuit as a control for a voltage controlled switch to create a pulse train wherein the pulse widths differ by a predetermined dwell from the widths of pulses in an input pulse train and to couple the modified pulses and the input pulse train to a logic device to generate an equal width pulse for each input pulse for averaging as a voltage analog of the input pulse frequency.

Another object of the present invention is to provide a DC voltage analog of the frequency of pulses in an input pulse train by modifying the widths of the input pulses a predetermined amount and coupling the modified pulses and the input pulses to a logic device to develop equal width pulses for averaging as a DC voltage analog.

Another object of the present invention is to develop a DC voltage level analog of frequency for substantially rectangular periodic input pulses by using an RC timing circuit to extend the pulse widths of the input pulses and coupling both the extended and an inverted version of the input signals with a NAND logic device to develop equal width pulses for averaging as the DC voltage analog.

Figure 2:
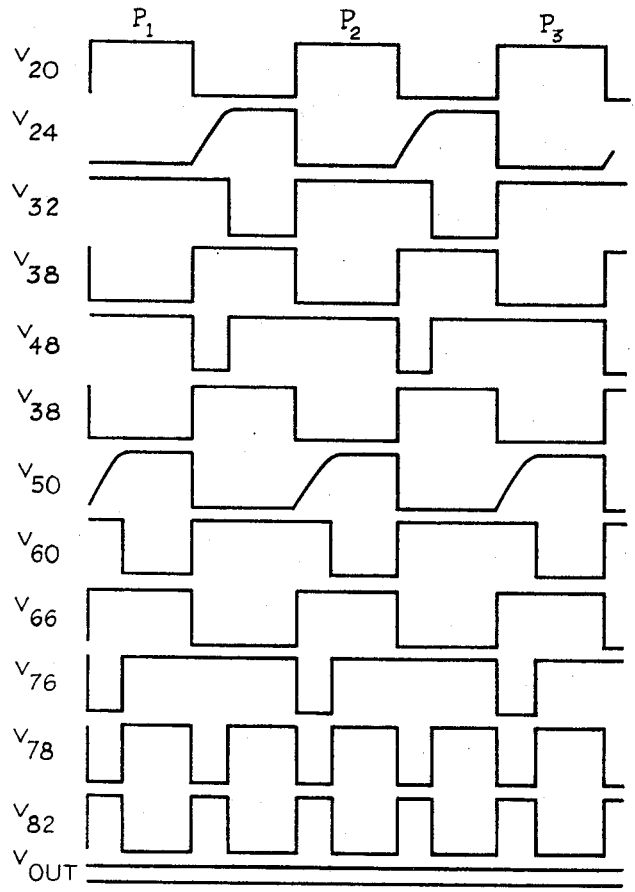

These and other objects and advantages of the present invention will become more readily apparent as reference is had to the accompanying specification and drawings wherein:

FIG. 1 is a circuit schematic for the tachometer processing circuit of the present invention; and FIG. 2 is a timing diagram for the operation of the tachometer of FIG. 1.

Reference should now be made to the drawing of FIG. 1 wherein the processing circuit of the present invention is shown in an arrangement for measuring the speed of rotation of a rotating member 10. A tachometer 12 monitors the rotating member and develops a periodic input signal for connection through a resistor 14 with the processing circuit of the present invention. A DC voltage analog of frequency is developed at the output identified as $V_{OUT}$ in the drawing.

A variety of forms for the rotating member 10 and the tachometer 12 can be accommodated by the processing circuit of this invention. Many tachometer arrangements are known in the prior art suitable for use with the instant processing circuit; inasmuch as the rotating member 10, the tachometer 12, and their interconnection form no specific part of the present invention, no details related thereto are shown in the drawing or set forth herein. As regards the present invention, the tachometer serves as the source for a periodic input signal which could equally be derived from other periodic signal generating systems. For simplicity, the tachometer 12 is assumed to provide a periodic square-wave having half-wave symmetry. Neither the half-wave symmetry nor the rectangular character of the input are essential as the processing circuit inherently "squares up" the input and, in addition, the processing circuit is fully operative to measure the frequency of pulses in a pulse train lacking half-wave symmetry.

A transistor 16 at the input to the processing circuit has its collector and base electrodes shorted together such that it functions as a diode, blocking the input voltage from the resistor 14 when the input is positive and passing current to the resistor 14 when the input is negative. A resistor 18 connects the transistor 16 with a source of positive bias represented in the drawing as a terminal labelled "Positive Bias Voltage." It should be appreciated that the bias source can take a variety of known forms; accordingly, no particular embodiment is shown or described. The waveform of the signal at the base-collector junction of transistor 16 is shown in FIG. 2 where it is labelled $V_{20}$ to correspond with the identification of the base-collector junction as node 20 in the circuit schematic.

Voltage $V_{20}$ is a symmetric square-wave alternating in polarity with the periodic signal from tachometer 12. When the tachometer applies positive voltage to the resistor 14, transistor 16 is reverse biased and the voltage at node 20 is high. Conversely, when the tachometer 12 applies negative voltage through resistor 14, transistor 16 conducts and the voltage at node 20 is low. Thus, it should be understood that the transistor 16 inherently "squares up" the input signal to the processing circuit within limitations based on voltage levels and component values. However, for the present description, the assumption set out above controls: the output from the tachometer 12 is a square-wave voltage, with half-wave symmetry, at a frequency related to the speed of rotation of the rotating member 10. Accordingly, the voltage $V_{20}$ has the same frequency and waveform as the voltage from the tachometer. It is this voltage $V_{20}$ which is applied to the processing circuit of the drawing.

The circuit schematic of the drawing includes two identical processing stages. First, the processing performed by the stage which includes the input transistor 22 will be explained and subsequently the processing by the second stage will be summarily described in light of the first detailed explanation.

Transistor 22 provides amplification of the voltage $V_{20}$ at the input to the first processing stage. Additionally, the transistor 22 inverts the voltage shown in the waveform $V_{20}$; thus, the voltage waveform at node 24 would be simply an amplified inverse of the voltage $V_{20}$ except for the effect of the RC timing circuit comprising capacitor 26 and resistor 28. The voltage at node 24 during operation is shown as $V_{24}$ in FIG. 2.

Voltage $V_{24}$ is applied to the input of a voltage controlled switching device shown as a transistor 30. Thus, $V_{24}$ controls the transistor 30 such that, taking account of an inversion of polarity caused by transistor 30, the output on line 32 connected with the collector of transistor 30 has the same frequency as the periodic input signal to the processing stage, but each positive voltage pulse has a predetermined dwell extension as shown in FIG. 2 where the voltage on line 32 is denoted $V_{32}$. By this action of the transistor 30 controlled by $V_{24}$, the symmetric waveform $V_{20}$ is rendered asymmetric by a predetermined dwell in each cycle to produce the waveform $V_{32}$.

Transistor 22 which operates as an amplifier and transistor 30 which operates as a voltage controlled switch are connected respectively through resistors 28 and 34 with the Positive Bias Voltage to provide requisite bias for operation.

As shown in the diagram and as is apparent from the circuit schematic, the voltage $V_{24}$ is at a low level when the voltage $V_{20}$ is at a high level since transistor 22 is conductive during that time. When the voltage $V_{20}$ changes to a low level, transistor 22, operating as a switching device, is rendered nonconductive and the voltage at node 24 would assume a high level but for the capacitor 26. In view of the capacitor 26, the voltage at node 24 rises exponentially with a time constant determined by the timing circuit comprising the capacitor 26 and resistor 28. Thus, the RC timing circuit is seen to control the input base bias potential of transistor 30 delaying the rise of voltage to switch the output of transistor 30. When the voltage $V_{24}$ attains a predetermined level, transistor 30 is switched on creating, over several cycles, the voltage $V_{32}$ on line 32 at the output of transistor 30.

In accordance with the described control of the switching device 30, the symmetric waveform $V_{20}$, as noted above, is rendered asymmetric in each cycle by a fixed predetermined amount of dwell set by the timing circuit connected with the base of transistor 30 to generate the waveform $V_{32}$. As an alternative, viewing the voltage $V_{20}$ as a pulse train comprising pulses $P_1$, $P_2$, and $P_3$, the timing circuit controls the voltage controlled switch, transistor 30, such that the input pulse train is modified to provide pulses having widths greater than the widths of the input pulses by a predetermined dwell set by the timing circuit.

Transistor 36 develops an inverted version of the voltage available at node 20 in a manner similar to that described above with regard to transistor 22. This inverted voltage is available on the line 38, and is shown as $V_{38}$ in the diagrams of FIG. 2. A bias resistor 40 interconnects the collector of transistor 36 with the Positive Bias Voltage.

Transistors 42 and 44 together with resistor 46 provide a NAND logic function such that the voltage on the conductor 48 at the collector of transistor 44 is at a high level except during the time of the extended dwell of the pulses on the conductor 32. The voltage $V_{48}$ of FIG. 2 graphically depicts the output from the NAND logic device. The signals $V_{32}$ and $V_{38}$ control the output and comparison of these signals with the voltage $V_{48}$ clearly shows the logic operation performed by the processing circuit — $V_{48}$ is high except when both $V_{32}$ and $V_{38}$ are high.

The processing stage just described develops pulses of equal width in response to an input periodic signal. One pulse is developed for each cycle of the input. To enhance the sensitivity of the tachometer processing circuit, a second, identical stage for processing is provided. This second stage operates on the square-wave at the collector output of transistor 36 on line 38. A summary explanation of this second stage is set forth; the details follow from the operation of the first stage set out above.

An amplifier is connected with the square-wave on line 38 to develop a control voltage at the node 50. Transistor 52 and bias resistor 54 perform the requisite amplification of the input. The output at node 50 is shown in the graphs of FIG. 2 as $V_{50}$ and is analogous to the voltage $V_{24}$ at node 24 of the first stage.

A capacitor 56 coacts with the resistor 54, in a manner analogous to that set out above with regard to capacitor 26 and resistor 28, to delay the rise of voltage at node 50 subsequent to each low level pulse at node 50 as shown in the waveform $V_{50}$ of FIG. 2.

A voltage controlled switch shown as a transistor 58 provides an output on line 60 comprising a pulse train related to the pulses on conductor 38, but having pulse widths modified by the dwell time introduced by the control of the RC timing circuit. $V_{60}$ of FIG. 2 depicts the output waveform on line 60, and it should be appreciated from both the waveform drawings and the circuit schematic that the voltage $V_{60}$ is analogous to the voltage $V_{32}$ of the first processing stage. A bias resistor 62 connects the transistor 58 with the Positive Bias Voltage.

The voltage on line 38 is connected with a transistor 64 which provides an inverted version of the voltage $V_{38}$ on a line 66, shown as $V_{66}$ in FIG. 2. A resistor 68 connects the collector of transistor 64 with the Positive Bias Voltage.

The voltage $V_{66}$ is applied to the base of a transistor 70 and the voltage $V_{60}$ is applied to the base of a transistor 72. These transistors 70 and 72, together with a resistor 74, function as a NAND logic device controlled by the voltages $V_{60}$ and $V_{66}$ such that a pulse train having pulses related to the extended dwell introduced by the RC timing control is developed at the collector of transistor 72. The output from the NAND logic device on conductor 76 is shown as $V_{76}$ in FIG. 2.

Voltage $V_{76}$ and voltage $V_{48}$ are summed on the line 78 at the input to the Darlington amplifier comprising transistor 80, transistor 82, and resistor 84. The voltage on line 78, shown in FIG. 2 as $V_{78}$, is amplified and inverted by the Darlington amplifier. The amplifier output is identified in the waveform drawings as $V_{82}$ and comparison with $V_{78}$ points out the inverse relation.

A two-stage RC filter comprising resistors 86 and 88 and capacitors 90 and 92 averages the voltage pulses of voltage $V_{82}$. A two-transistor amplifier comprising transistors 94 and 96 and resistors 98 and 100 amplifies the DC analog voltage from the RC filter. The output amplifier affords impedance matching at the output and provides the output analog voltage $V_{OUT}$ across resistor 100.

Although the foregoing has proceeded in terms of a particular embodiment of the present invention, it should be understood that various modifications could be engrafted thereon by one skilled in the art without exceeding the appended claims.

I claim:

1. A circuit for measuring the frequency of pulses in a pulse train, comprising: a resistor; a capacitor; means interconnecting said resistor and said capacitor in a timing circuit for connection with said pulse train; a voltage controlled switching device having an input and an output; means connecting the input of said switching device with said timing circuit, said timing circuit controlling said switching device such that a first pulse is developed at the output of said switching device for each pulse in said pulse train, each of said first pulses developed at the output of said switching device having a duration differing from the duration of the associated pulse of the pulse train by a fixed predetermined amount of dwell set by said timing circuit; a logic device coupled with the output of said switching device and said pulse train to generate a second pulse having a width related to said predetermined dwell in response to each of said first pulses; and means coupled with said logic device for summing all of said second pulses and providing an average voltage related thereto, thereby providing a voltage level analog of the frequency being measured.

2. A circuit for measuring the frequency of a first train of substantially rectangular voltage pulses, comprising: a resistor; a capacitor; means interconnecting said resistor and said capacitor in a timing circuit for connection with said first train of voltage pulses; a voltage controlled switching device having an input and an output; means connecting the input of said switching device with said timing circuit, said timing circuit controlling said switching device such that a second train of substantially rectangular voltage pulses at the frequency to be measured is developed at the output of said switching device, each pulse in said second train of voltage pulses having a dwell greater than the associated pulse in said first train of voltage pulses by a fixed predetermined amount set by said timing circuit; a logic device coupled with said second train of voltage pulses and said first train of voltage pulses providing a signal pulse having a duration proportional to said predetermined dwell for each pulse in said second train of voltage pulses; and means coupled with said logic device for summing all of said signal pulses provided by said logic device and developing an average voltage related thereto, thereby providing a voltage level analog of the frequency being measured.

3. A circuit for measuring the frequency of pulses in a pulse train, comprising: a resistor; a capacitor; means interconnecting said resistor and said capacitor in a timing circuit for connection with said pulse train; a transistor switching device having an input and an output; means connecting the input of said transistor switching device with said timing circuit, said timing circuit controlling said transistor switching device such that a first pulse is developed at the output of said transistor switching device for each pulse in said pulse train, each of said first pulses developed at the output of said transistor switching device having a width differing from the width of the associated pulse of the pulse train by a fixed predetermined amount of dwell set by said timing circuit; means connected with said pulse train for inverting said pulse train; a NAND logic device coupled with said transistor switching device and the inverted pulse train providing a second pulse having a width proportional to said predetermined dwell in response to each of said first pulses; and means coupled with said NAND logic device for summing all of said second pulses and providing an average voltage related thereto, thereby providing a voltage level analog of the frequency being measured.

4. A circuit for measuring the frequency of a symmetric square-wave voltage, comprising: a resistor; a capacitor; means interconnecting said resistor and said capacitor in a timing circuit for connection with said square-wave voltage; a voltage controlled transistor switching device having an input and an output; means connecting the input of said transistor switching device with said timing circuit, said timing circuit controlling said transistor switching device such that a square-wave at the frequency to be measured is developed at the output of said transistor switching device having a waveform asymmetric in time in each cycle by a fixed predetermined amount of dwell set by said timing circuit; means connected with said symmetric square-wave voltage for inverting said symmetric square-wave voltage; a NAND logic device coupled with said transistor switching device and the inverted symmetric square-wave voltage providing a pulse in each cycle having a duration proportional to said predetermined dwell; and means coupled with said NAND logic device for summing all of said pulses provided by said NAND logic device and developing an average voltage related thereto, thereby providing a voltage level analog of the frequency being measured.

* * * * *